United States Patent [19]
Rutter et al.

[11] Patent Number: 5,697,410
[45] Date of Patent: Dec. 16, 1997

[54] LIQUID CONTAINER VALVE STRUCTURES FOR USE WITH SERVICE-LINE CONNECTORS

[75] Inventors: Christopher C. Rutter, Oakland; Lamar Spalding, Hayward, both of Calif.

[73] Assignee: Packaging Systems, Inc., Romeoville, Ill.

[21] Appl. No.: 528,394

[22] Filed: Sep. 13, 1995

Related U.S. Application Data

[63] Continuation-in-part of Ser. No. 305,458, Sep. 13, 1994, abandoned.

[51] Int. Cl.⁶ .................................................. B65B 3/00
[52] U.S. Cl. .......................... 141/346; 141/349; 141/352; 141/354; 137/614.04; 251/149.6
[58] Field of Search ........................ 141/346, 348, 141/349, 351–354; 137/614.04; 251/149.6

[56] References Cited

U.S. PATENT DOCUMENTS

| | | | |
|---|---|---|---|
| Re. 33,969 | 6/1992 | Richter . | |
| 3,972,387 | 8/1976 | Braun | 184/28 |
| 4,146,070 | 3/1979 | Angarola et al. | 141/68 |
| 4,186,783 | 2/1980 | Brandt | 141/18 |
| 4,375,864 | 3/1983 | Savage | 141/349 X |
| 4,421,146 | 12/1983 | Bond et al. | 141/349 |
| 4,445,539 | 5/1984 | Credle | 137/614.03 |
| 4,445,551 | 5/1984 | Bond et al. | 141/349 |
| 4,485,845 | 12/1984 | Brady | 137/614.04 |
| 4,549,577 | 10/1985 | Kugler | 137/614.04 |
| 4,564,132 | 1/1986 | Lloyd-Davies | 222/522 |
| 4,700,744 | 10/1987 | Rutter et al. . | |
| 4,890,642 | 1/1990 | Smazik et al. . | |
| 4,948,014 | 8/1990 | Rutter et al. | 222/83 |
| 4,991,635 | 2/1991 | Ulm | 141/346 |
| 5,072,756 | 12/1991 | Carr | 137/614.04 |
| 5,080,132 | 1/1992 | Manz et al. | 137/614.04 |
| 5,095,962 | 3/1992 | Lloyd-Davies et al. . | |
| 5,215,122 | 6/1993 | Rogers et al. | 137/614.04 |
| 5,255,713 | 10/1993 | Scholle et al. . | |
| 5,445,186 | 8/1995 | Richter et al. . | |

*Primary Examiner*—J. Casimer Jacyna
*Attorney, Agent, or Firm*—Majestic, Parsons, Siebert & Hsue

[57] ABSTRACT

A spout fitment attached to a liquid filled bag, or other fluid container, of a type having a slidable dispensing valve member to receive a line connector for establishing a fluid path from an interior of the container, through a valve element in the line connector and into a service line attached to the line connector. Although the dispensing valve member is slid into the container when the line connector is inserted therein, the sliding motion does not form the container valve action. The container seal is established by a valve element within the slidable dispensing valve member that is resiliently biased to close an opening therein. The dispensing valve member thus need not be slid in the fitment when the line connector is removed from the dispensing valve member, thereby making it easier to remove and reinsert the line connector. Insertion of the line connector within the dispensing valve member causes their respective valve elements to engage each other to open and form the fluid flow path.

28 Claims, 8 Drawing Sheets

LIQUID CONTAINER VALVE STRUCTURES FOR USE WITH SERVICE-LINE CONNECTORS

CROSS-REFERENCE TO RELATED APPLICATION

This is a continuation-in-part of application Ser. No. 08/305,458, filed Sep. 13, 1994, now abandoned.

BACKGROUND OF THE INVENTION

This invention relates generally to service-line liquid flow connectors which are removably connectable to valve containing fitments on liquid containing bags or other fluid containers.

There are many applications where liquid is packaged in a flexible plastic bag that, in turn, is contained within a corrugated cardboard box for purposes of shipment and use. Such containers of liquid are commonly supplied to users of the liquid which connect them into a liquid supply system on their premises. An example of this is in the soft drink industry, where containers of soft drink syrup are shipped to fast-food restaurants and other users. When a syrup container is emptied, it is removed by hand from connection with a soft drink mixing machine by detaching a line that is connected to the container. A fresh, full syrup container is then substituted for the empty one, and the liquid supply line is connected to the full container.

One popular system for removably connecting such a liquid line to a liquid supply container is provided by Liqui-Box Corporation. This system is described in its U.S. Pat. No. 4,421,146, which references earlier filed U.S. Pat. No. 4,445,551. The disclosures of these patents are incorporated herein by this reference. U.S. Pat. No. 4,421,146 describes in detail fitments, attached to the liquid supply bags, and line connectors, attached to the liquid supply lines, which interconnect with each other, essentially as commercially available from the patentee. Briefly, the line connector includes a spring loaded valve to close off an opening at its end. The spout fitment attached to the container includes a sliding dispensing valve member with an opening to receive the end of the line connector. The valve member is slid with respect to the fitment and into the bag when the line connector is attached to the fitment. The valve member includes one or more openings along a side wall that becomes exposed within the bag to receive liquid when the valve member is so slid in response to the connector being attached. Upon removal of the connector, the sliding valve member is pulled back into position within the fitment to close off the side liquid openings. The spring loaded valve within the connector is urged open when inserted into the sliding member upon engaging a rigid post aligned with the connector valve, and closes upon removal of the connector from the valve member.

Users often find it desirable to remove a partially emptied container from their fluid supply system and reconnect it at a later time. An example with containers of soft drink syrup exists when a fast-food restaurant, for example, wants to make sure that full syrup containers are attached to their soft drink mixing machines prior to a busy time such as during a normal lunch period. The line connectors are then manually disengaged from each such partially emptied container and reconnected to a full container. After the lunch period, at a slower time in the day, the user will reconnect the earlier disconnected partially emptied container in order to use the remaining syrup in it.

This existing system requires a substantial amount of force to connect and disconnect the line connector to the liquid bag fitment. This is because of the force required to slide the dispensing valve member within the fitment between its opened and closed positions when the line connector is attached and removed, respectively. The resulting difficulty for a user is especially significant in those applications requiring disconnection and reconnection of individual containers.

Therefore, it is a principal object of the present invention to provide an improved connection system that is easier to manipulate by hand.

SUMMARY OF THE INVENTION

This and other objects of the present invention are accomplished briefly and generally, by modifying the valve member within the container spout fitment to eliminate the necessity of the sliding action to open and close the container. The container valve is provided by a resiliently loaded valve element contained within the fitment in alignment with the spring loaded valve that normally closes off the line connector liquid opening. As the line connector is inserted into the spout fitment, its resiliently loaded valve engages that of the line connector to cause each of them to open. In a preferred embodiment, this resiliently loaded spout fitment valve is contained in a sliding element that is slid into the bag upon an initial attachment of a line connector. This is in order to accommodate the existing line connector that is permanently installed in a large number of establishments. Although force must be applied to the line connector to slide this element inward, the first time the line connector is attached to a container, the sliding element remains in that inward position during any subsequent disconnections or reconnections of the line connector. Thus, the line connector is removed from the spout fitment without having to apply force to return the sliding element to its initial position. Also, no force is necessary to move the slider upon reconnection of the line connector to that same fitment.

Additional objects, advantages and features of the various aspects of the present invention will become apparent from the following description of its preferred embodiments, which description should be taken in conjunction with the accompanying drawings.

DESCRIPTION OF THE PREFERRED EMBODIMENTS

Figure 1:
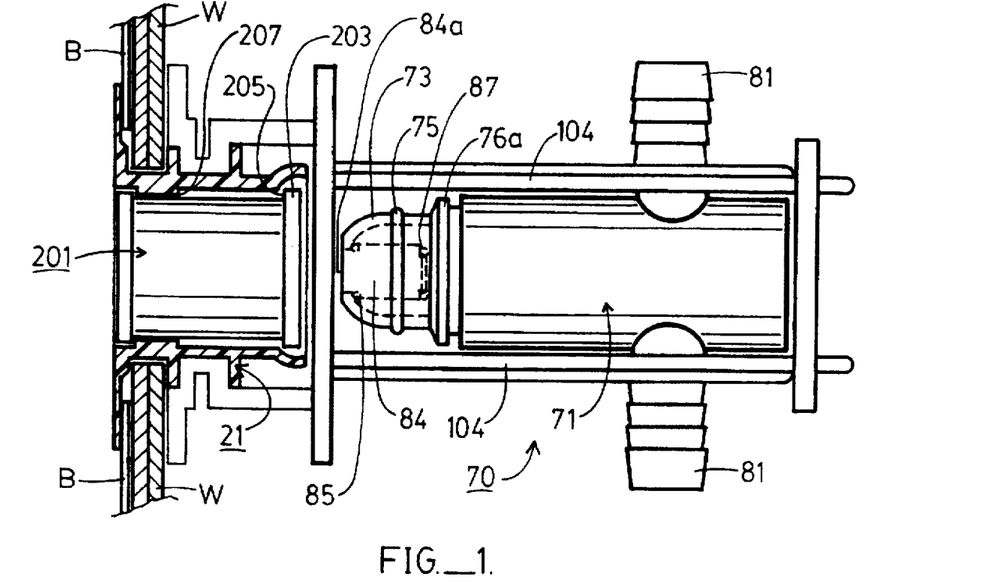
FIG. 1 is a view of a line connector of the current design partially attached to a container spout fitment that includes the improved valve arrangement of the present invention.
Figure 2:
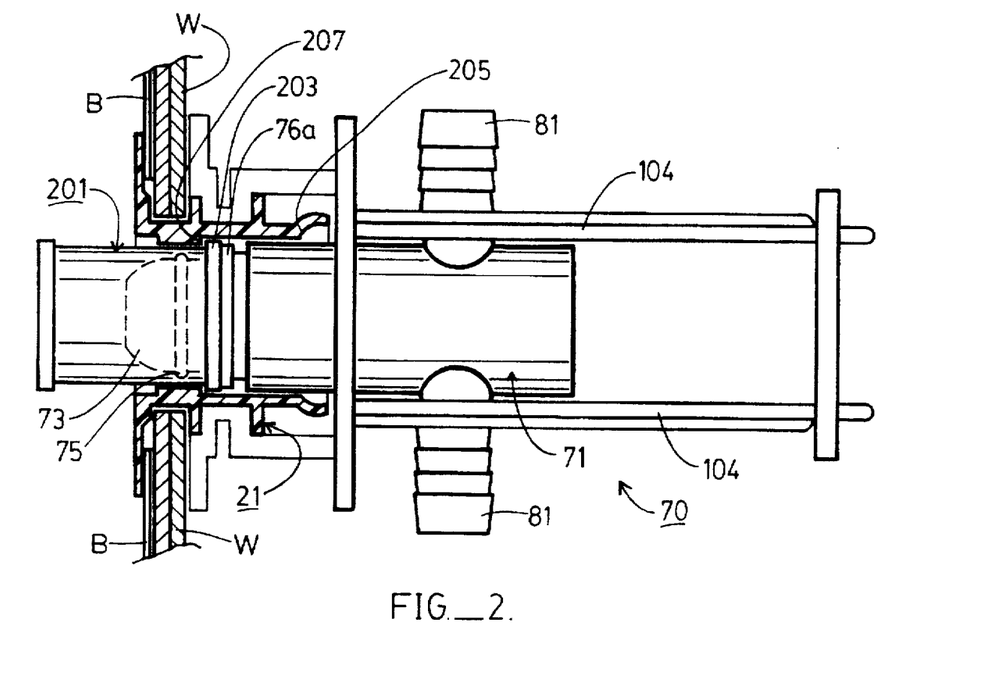
FIG. 2 is a view similar to that of FIG. 1 but with the line connector fully connected with the container spout fitment.

Referring initially to FIGS. 1 and 2, the aspect of the invention which is generally illustrated in those figures is described for use with line connector and fitment elements already described in detail in aforementioned U.S. Pat. No. 4,421,146. Therefore, these aspects of the structure illustrated in FIGS. 1 and 2 are not repeated here. Those elements of the combination of the FIGS. 1 and 2 which are described in the aforementioned patent are given the same reference number as in that patent, for easy reference should additional details be desired.

As described in that patent, a fitment 21, shown in cross section in FIGS. 1 and 2, is attached to a bag B that is contained within a corrugated cardboard package having walls W. A line connector 70 is removably attached to the fitment 21 by sideways movement of the line connector with respect to flanges provided as part of the fitment 21. A connector body 71, having fittings 81 for connection into liquid supply lines, is manually slidable among guide strips 104 from a disengaged position of FIG. 1 to a fully engaged position of FIG. 2. A liquid receiving opening 83 at an end 73 of the connector body 71 is normally closed by a valve 84 and an o-ring 85 which are sealed by the force of a spring 87. The valve 84 is opened by pushing something against it through the connector body liquid receiving opening 83.

According to the present invention, the dispensing valve member 22 of the aforementioned patent is replaced by a slider 201 whose outside surface is shown in FIGS. 1 and 2. Before describing the internal structure of the various embodiments of the slider 201, its operation is first generally described by reference to FIG. 1. The slider 201 is tightly held within the spout fitment 21. Resistance to moving the slider 201 to a position shown in FIG. 2 from that shown in FIG. 1 is provided by the combination of a flange 203 on the outside of the slider 201 and a ledge 205 of slightly smaller diameter provided on an inside surface of the fitment 21 in which the slider 201 is contained. Once engaged by the line connector body 71, however, as it is pushed into the slider 201, that resistance is overcome with sufficient hand force to move the slider to the position shown in FIG. 2, wherein the flange 203 abuts a circular ledge 207 provided on the inside surface of the fitment 21.

Once in the position shown in FIG. 2, according to the present invention, the slider 201 does not return to the position shown in FIG. 1, even when the line connector body 71 is withdrawn to its position shown in FIG. 1. No mechanism is provided for attaching the slider 201 to the line connector body 71 upon withdrawal of the line connector 71 from the fitment, contrary to the emphasis of the structure described in the aforementioned patent. Thus, the force required for withdrawing the line connector body 71 from the fitment is significantly reduced, as is the force required to reconnect the line connector body 71 through a container whose slider 201 had previously been moved into the position shown in FIG. 2.

Instead of requiring the slider 201 to be moved back and forth with respect to the fitment 21 in order to close off the spout into the container bag, the present invention employs a resiliently loaded valve element within the slider 201 that is aligned to engage the end 84a of the spring loaded valve 84 of the line connector body 71. Resilient forces urging each of these valve elements toward closed positions thus work to open each of the valves as the line connector body 71 is moved from the position shown in FIG. 1 to that shown in FIG. 2. Similarly, removal of the line connector body 71 from the slider 201 results in these two valves closing from the urging of their respective resilient elements, without the necessity to pull the slider 201 back to its initial position within the fitment 21. Similarly, reattachment of the line connector body 71 with the slider 201 causes the respective slider and line connector valves to open by the resilient forces applied between them, again without any need to move the slider 201. It will also be noted that there is no spring or other resilient element which urges the slider 201 to move or be held in one of its static positions.

Figure 3A:
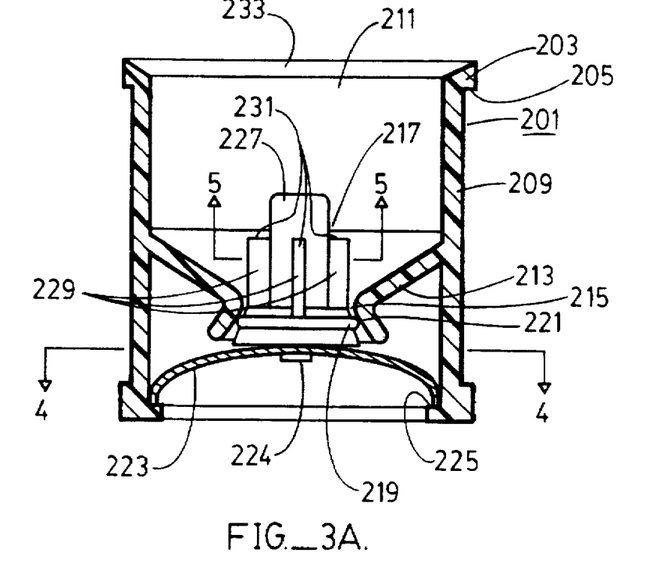
FIGS. 3A, 3B and 3C, show an improved container fitment valve assembly according to one embodiment of the present invention, and its operation when a line connector is being connected to it.
Figure 4:
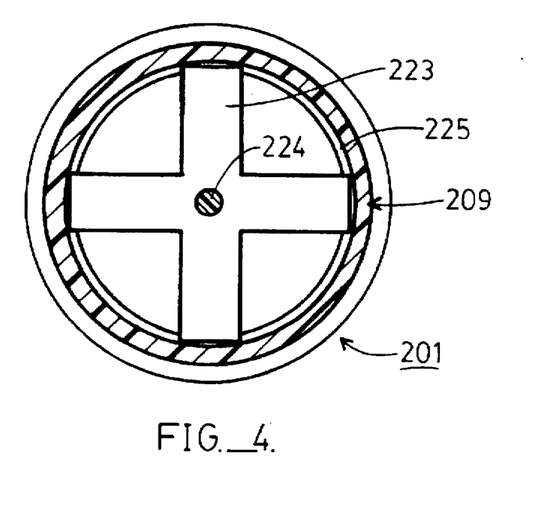
FIG. 4 is a sectional view of the valve assembly of FIGS. 3A, 3B and 3C, taken at section 4—4 of FIG. 3A.
Figure 5:
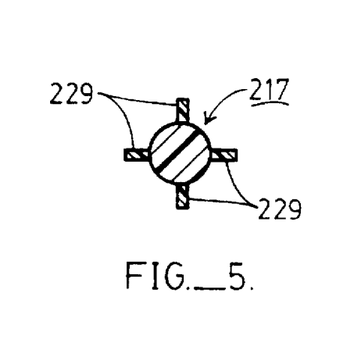
FIG. 5 is a sectional view of the valve assembly of FIGS. 3A, 3B and 3C, taken at section 5—5 of FIG. 3A.

One embodiment of such a valve assembly within the slider 201 is described with respect to FIGS. 3A, 4 and 5. A generally cylindrically shaped molded plastic shell 209 includes an opening 211 at one end for receiving the tip 73 of the line connector body 71. A wall 213 extending across the opening to the shell 209 closes off that opening except for a smaller opening 215 in the wall 213. In the opening 215 is positioned a valve element 217. The valve element 217 includes an o-ring 219 carried by an end having a shape such that the valve element 217 is held stationary with the o-ring urged against a valve seat 221 by a leaf spring element 223, preferably made of stainless steel. Of course, some other known sealing mechanism could be employed. The valve element 217 is attached to the spring element 223 with a pin 224. The spring 223 is generally star shaped, as shown in the cross-sectional view of FIG. 4, but can be of any other convenient shape, so long as liquid is allow to flow through it. It is retained within the shell 209 by outward ends thereof abutting a circular ledge 225 that is a unitary part of the shell.

Figure 3B:
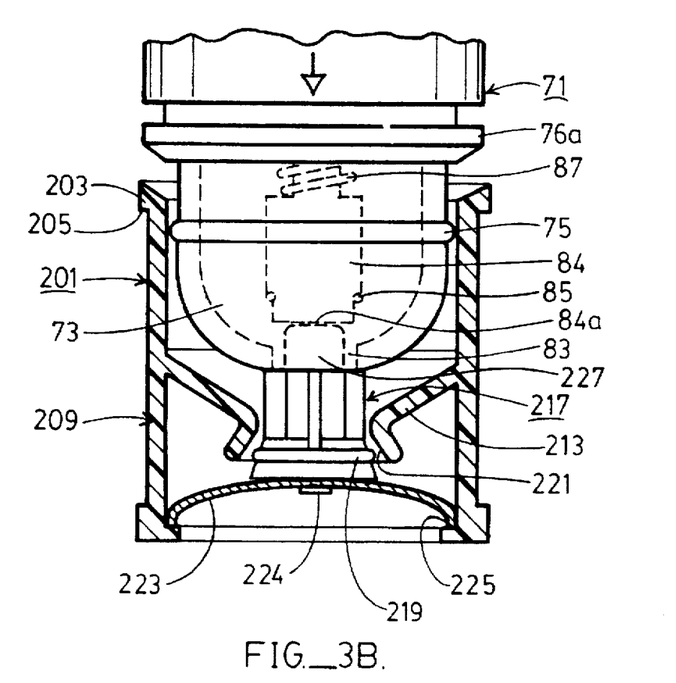

The valve element 217 includes an extreme probe portion 227 with a plurality of ribs 229 equally spaced therearound. The ribs form abutment surfaces 231 at end edges thereof, adjacent the probe 227. These surfaces 231 are all positioned the same distance from the end of the probe 227. As can be seen from FIG. 3B, the probe 227 has an outer circumference that fits within the end opening 83 of the line connector body 71. The diameter of the probe portion 227 is made to be sufficiently less than that of the connector body opening 83 so as to allow liquid to flow therebetween when the probe is inserted into the connector, as is shown in FIG. 3B. The rib end surfaces 231, however, are sized to extend beyond the opening 83 and abut the end 73 of the line connector body 71.

Figure 3C:
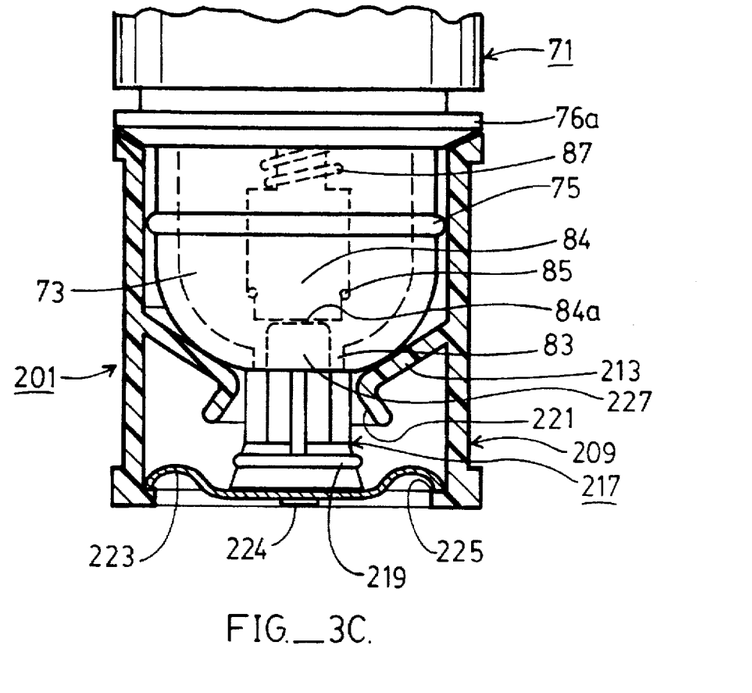

Thus, as can be seen from FIGS. 3B and 3C, insertion of the line connector body into the open end 211 of the shell 209 causes the valve 84 within the connector body to be pushed against its spring 87 a distance equal to that between an end of the probe 227 and the surfaces 231 of the ribs 229 of the valve element 217. The valve element 217 remains substantially closed as this occurs, since the resilient force of the spring element 223 in this closed position is made to be stronger than that of the line connector spring 87. After depression of the line connector valve, further insertion of the line connector end 73 into the shell 209 causes the valve element 217 to be moved inward of the wall 213 against the resilient force of the spring element 223. This is because the solid end of the line connector surrounding the opening 83 is pushing directly against the rib end surfaces 231. The line connector valve remains open as the valve element 217 is opened. FIG. 3C shows the connector body tip 73 fully inserted into the shell 209, wherein both valves are opened.

As a modification to the container fitment valve element 217 that is shown, the ribs 229 can be omitted. The relative strengths of the fitment spring element 223 and the line connector valve spring 87 are then more carefully controlled so that both valves are opened when the line connector end 73 is fully inserted into the slider 201 to the position shown in FIG. 3C. In either case, no post or other rigid element is required to be fixedly attached to either the shell 209 or any other part of the fitment in order to open the line connector valve upon such connection.

In the embodiments being described herein, it is when the line connector 71 is fully inserted into the slider 201, as shown in FIG. 3C, that the slider 201 is moved from the position shown in FIG. 1 to that shown in FIG. 2. It is in this fully inserted position that a resilient O-ring seal 75 on the outside of the line connector 71 engages an inside surface of the shell 209. The line connector body 71 is shown in FIG. 3C to engage the slider 201 in two locations. One such location is against the wall 213 that extends across the interior of the cylindrically shaped hollow shell 209. It will be noted from FIGS. 3A, 3B and 3C that the wall 213 is formed in a shape generally to match that of the end 73 of the line connector body 71 for this purpose. A second surface of contact is between a contact shoulder 76a, extending around the line connector body 71, and an edge 233 at the open end 211 of the shell 209. The contacting surfaces have complimentary shapes. In practice, only one such contact needs to be maintained in order to be able to move the slider 201 with the initial insertion of the line connector body 71.

Thus, it can be seen from the foregoing that sliding of the slider 201 is not necessary to open and close the spout to the container bag. The sole liquid path from the bag is through the opening 221 in the wall 213 when the valve 217 is depressed against the force of its spring 223. No fluid openings are provided on the side of the generally cylindrically shaped molded plastic shell 209.

Therefore, since the movement of the slider 201 no longer operates as the container valve, the system described above can also be modified to eliminate that movement if another line connector is substituted for that being described. Such a modified line connector will have a different shape so as to be fully engaged with the container fitment without having to push the slider 201 to its inward position of FIG. 2. A different technique for positively interconnecting the line connector and container fitment can also be substituted for that of the existing commercial system. Specifically, the existing sideways interconnection system can be replaced with one allowing the line connector to be axially inserted into the fitment, rather than being attached from the side, and then automatically be latched into place by a spring loaded latch element.

Figure 6A:
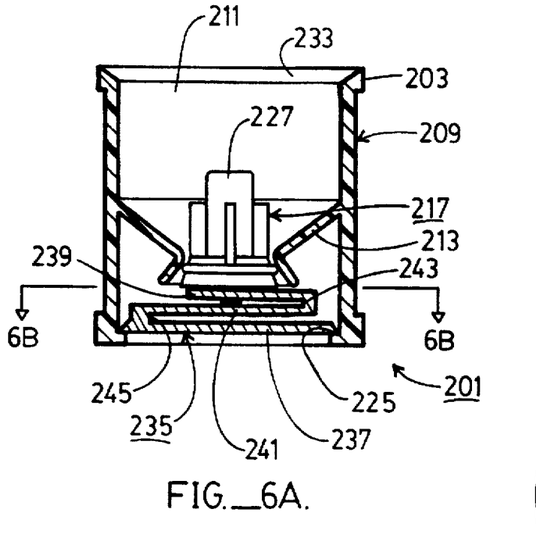
FIG. 6A shows a fitment valve assembly according to another embodiment of the present invention.
Figure 6B:
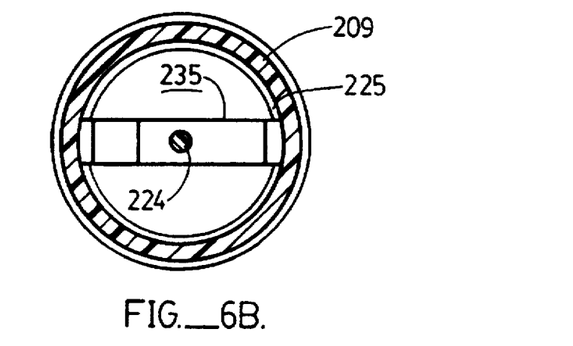
FIG. 6B is a cross-sectional view of the embodiment of FIG. 6A, taken at section 6B—6B thereof.

Various specific shapes of the valve element in the slider 201 and its retaining resilient force mechanism can be employed. Referring to FIG. 6A, another embodiment of the slider 201 is illustrated in cross-sectional view, wherein, as the only change from that shown in FIGS. 3A, 3B and 3C, is a substitution of a different type of spring element 235 for the spring element 223. A base strip 237 does not yield. A top portion 239, attached to the valve element 217 by the projection 224, is attached to the base 235 through an intermediate member 241. Two hinge points are formed at a connection 243 of the top portion 239 with the intermediate portion 241 of the spring 235. Similarly, two hinges are formed at an interconnection 245 between the intermediate portion 241 and the base 237 of the spring 235. The result is that the valve element 217, when force is applied to it, moves axially in a direction substantially perpendicular to the base member 237.

Figure 7:
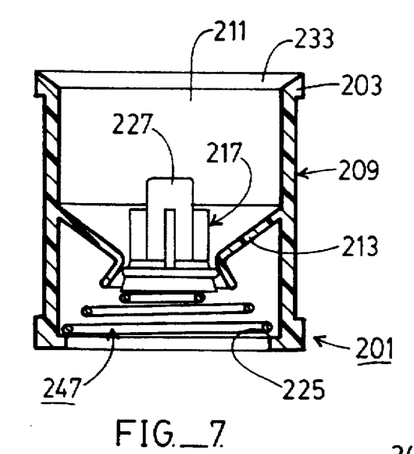
FIG. 7 is a view of a fitment valve assembly according to another embodiment of the present invention.

Yet another embodiment, shown in FIG. 7, includes a small coiled spring 247, made of metallic wire, in compression between the valve element 217 and the ledge 225 formed as part of the shell 209.

Figure 8:
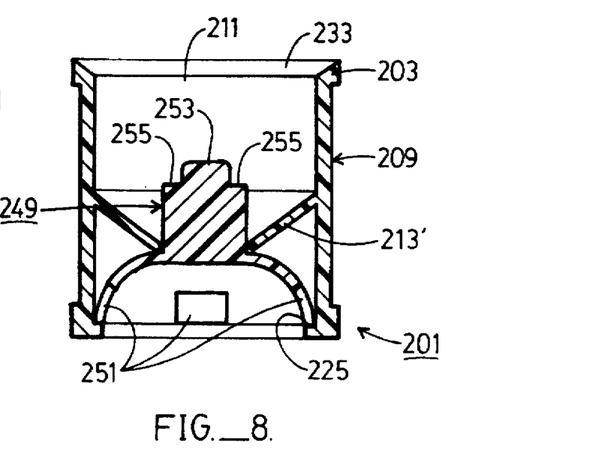
FIG. 8 shows yet another embodiment of the improved fitment valve design of the present invention.

Referring to FIG. 8, another embodiment is described, wherein the valve 217 and one of the respective springs of the prior embodiments are replaced with a unitary resilient molded piece 249. This piece 249 includes a cup shaped, flexible diaphragm base portion with edges held adjacent the internal ledge 225 of the shell 209 and including liquid flow openings 251. A probe 253, extending from the base and made large enough to have sufficient stiffness, is designed to contact the end 84a of the valve within the connector body 71, similar to the probe 227 of the valve 217 of the previous embodiments. Flanges also form surfaces 255 to engage the connector end adjacent its opening 83. When the line connector is urged against the valve 49, its base portion deflects and moves away from a normal sealing engagement with edges of an opening in a wall 213'. Liquid then flows through the opening. It will be noted that the wall 213 is shaped somewhat differently than the wall 213 of the prior embodiments.

Another embodiment of a valve assembly is shown in various operating positions in the cross-sectional views of FIGS. 9–15. This embodiment is similar to that described above with respect to FIGS. 1–5 but also with some significant differences. A fitment 301 is similar to the fitment 21 (FIGS. 1 and 2). The fitment 301 is also attached to a bag or other container (not shown in FIGS. 9–15), and includes the same annular rings extending around an outside to which a line connector of the same type as line connector 70 is removably attached. A line connector shown in FIGS. 11–14 is given the same reference numbers for corresponding elements but with a prime (') added. A slider 303 contains a different valve assembly and other details from what is contained in the slider 201 already described with respect to FIGS. 1–5. Operation of the slider 303 is generally the same as that of the slider 303: the first time the end 73' of the connector body 71' is inserted into the fitment 301 of a fresh container of liquid, the slider 303 is pushed from a rest position shown in each of FIGS. 10–13 into the container (FIG. 14) when a liquid connection is established between the connector and an interior of the container. When the connector body 71' is thereafter removed from the slider 303 (FIG. 15), the slider 303 remains extended into the container. Other differences between the embodiment of FIGS. 9–15 and that of FIGS. 3–5 is that an outside surface of the slider 303 and an inside surface of the fitment 301 are provided with cooperative shapes in order to more positively retain the slider in its various positions within the fitment 301.

Figure 9:
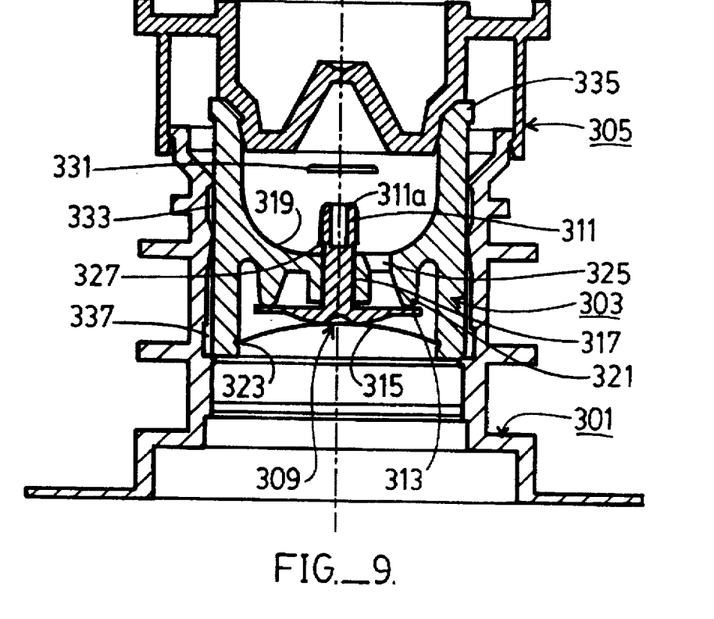
FIGS. 9-15 are cross-sectional views of an improved container fitment valve assembly according to another embodiment of the present invention, showing its operation when a line connector is connected and disconnected from it.
Figure 10:
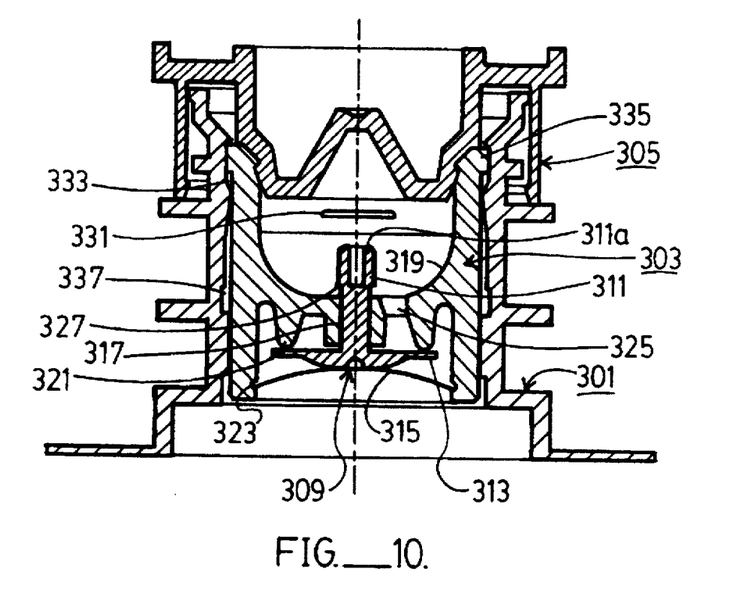

FIGS. 9 and 10 also show attachment of a cap 305 to the fitment 301 and slider 303. The plastic cap 305 is removable by hand or a filling machine from either of its positions shown. FIG. 9 shows the configuration of the capped container fitment before the container is filled with liquid. An empty collapsed plastic bag or other type of container is shipped with the slider 303 loosely held within the fitment 301 near an outside end, as shown in FIG. 9. As part of the filling process, the cap 305 and slider 303 are removed as a single unit from the fitment 301 in order to provide a large opening to receive a filling nozzle for rapidly filling the container with liquid. After filling, the slider 303 and cap 305 are inserted as a unit back into the fitment 301. The slider 303 is positioned far enough within the fitment 301 to "snap" into place in a manner to prevent the slider 303 from moving out of the fitment 301, as shown in FIG. 10. The cap 305 remains in place during shipment of the filled container.

The user then removes the cap 305 when connecting the container to a line connector. The same general filling technique and cap are used in the embodiment of FIGS. 3–5 but not explicitly shown there.

The structure and operation of the valve member within the slider 303 of FIGS. 9–15 will now be described. A valve element 309 contains an elongated cylindrically shaped post that terminates at a free end in a probe 311 that has an extreme end surface 311a. The valve post extends through an opening 317 in a wall 319 across the slider 303. A flange 313 exists on an opposite end of the probe 311. An annular ridge 321 is integrally formed with the post on an opposite side of the slider wall 317 from the position of the probe end 311a. An outside edge of the ridge 321 serves as a valve seat. The flange 313 is held against this valve seat, when a line connector is not fully attached (FIGS. 10, 11 and 15), by the force of a single piece of spring metal 315 or other resilient structure. The spring 315 is most easily formed in an elongated shape, with ends being captured and held in a groove 323 formed on an inside surface of the slider 303. A narrow width (in a direction into the drawing) of the spring 315 assures enough space around it within the slider for liquid flow through the slider from the container when a line connector is attached.

Figure 12:
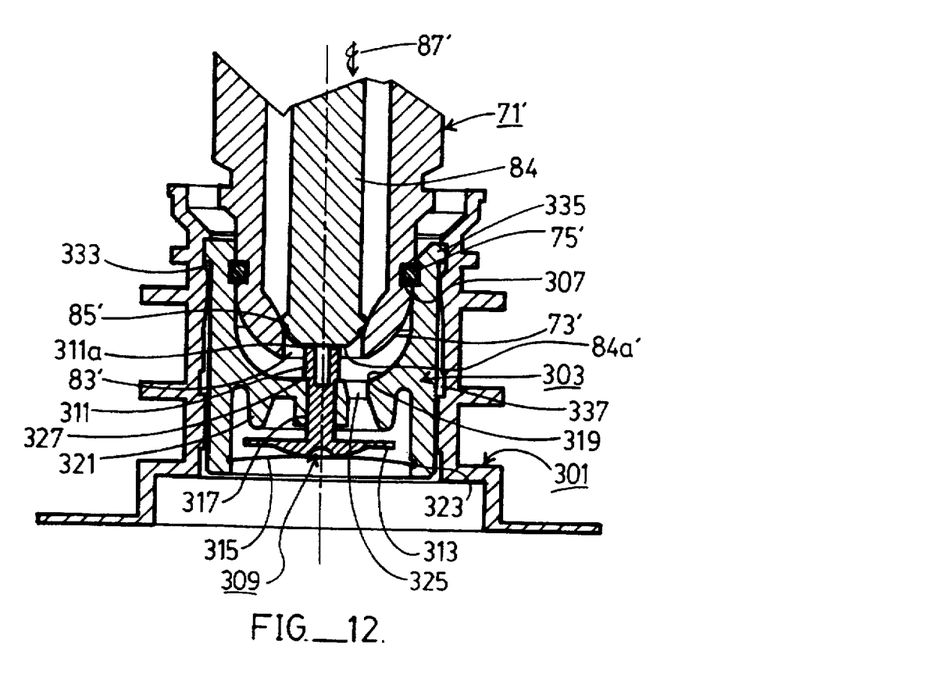
Figure 13:
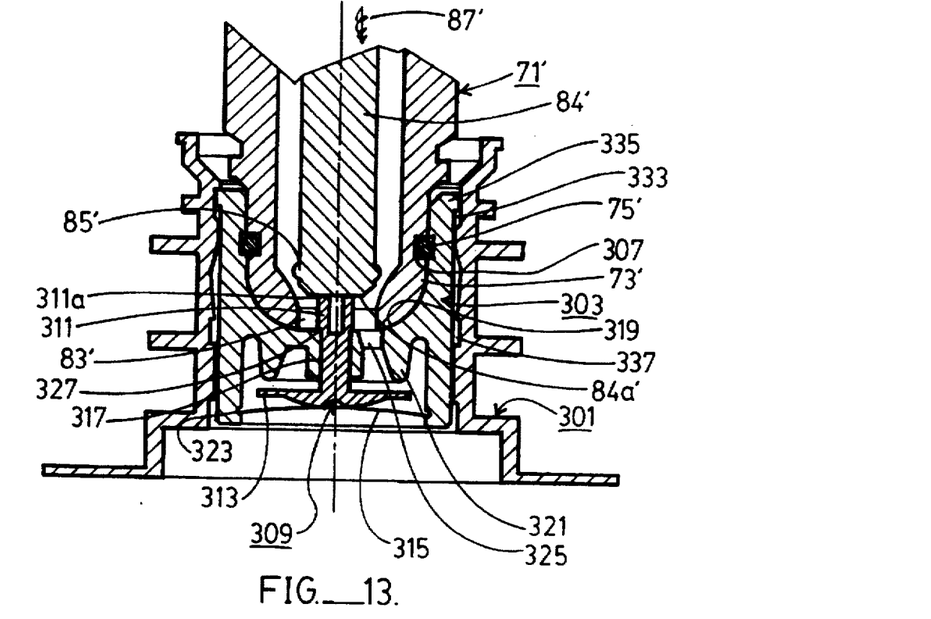
Figure 14:
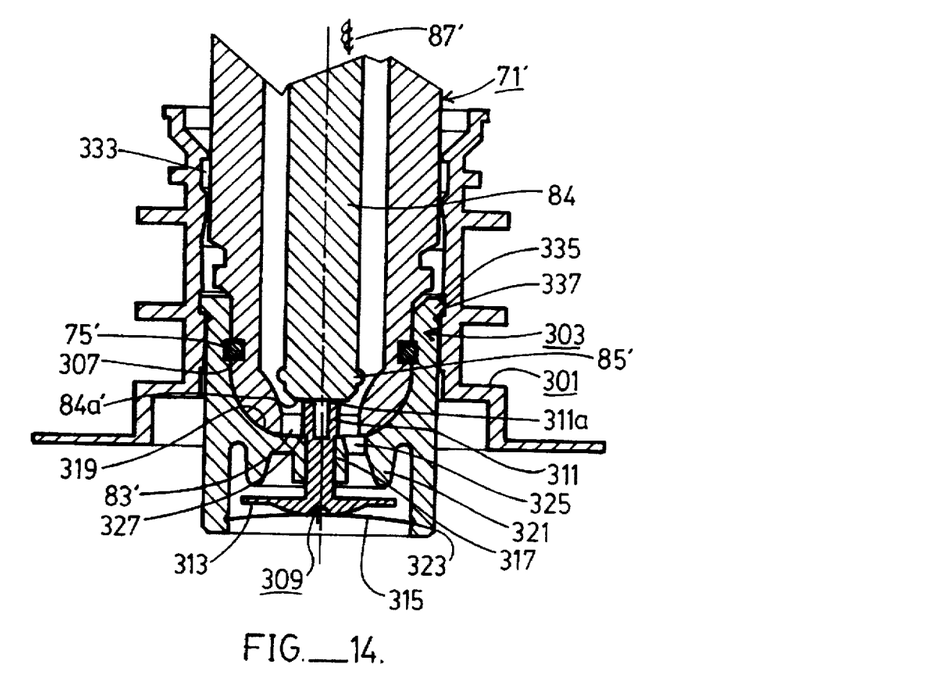

An aperture 325 in the slider wall 319 provides for liquid flow through the wall 319 when the flange 313 of the valve element 313 is moved away from the valve seat formed by the slider ring 321 (FIGS. 12–14). Multiple such apertures may be used if necessary to obtain a desired liquid flow through the valve structure when it is opened. By surrounding the opening 317 with the slider annular ring 321, leakage of liquid through the opening 317 is prevented when the flange 313 is urged against the ring 321 to close the valve.

A ledge 327 is formed on the post of the valve member 309 to provide a stop to limit travel of the member 309 in a direction into the hole 327. The diameter of the post suddenly changes from a value less than that of the opening 317 to a value greater than that of the opening 317, thus forming the ledge 327. Use of the ledge 327 to limit travel of the member 309 against an axial force applied by the line connector valve 84' is shown in FIGS. 12 and 13.

Figure 11:
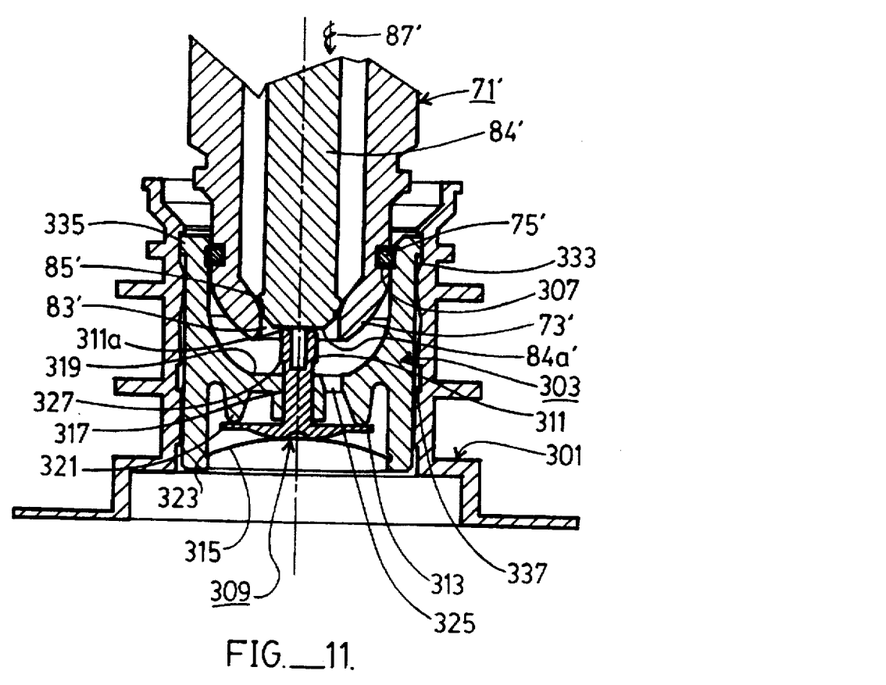

Operation of the slider and its valve structure, when a line connector is connected and disconnected from the fitment 301, can be observed by comparing the views of FIGS. 11–15. In FIG. 11, the line connector body 71' is inserted into the open end of the slider 303 until the line connector valve end 84a' has just contacted the probe end 311a of the slider valve structure. In the position of FIG. 11, the line connector O-ring 75' has established a seal with an inside surface of the slider. Further movement of the line connector body 71' into the slider 303 opens the slider valve, as shown in FIG. 12, before the line connector valve 84' is opened. In this embodiment, the line connector valve spring 87' is stronger than the spring 315 of the slider valve. In the position of FIG. 12, the ledge 327 is urged by the connector valve 84' against the slider wall 327.

When in the position of FIG. 12, the line connector valve could open somewhat (not shown) but the relative spring forces need to assure that both valves are opened when the connector valve is moved a maximum amount into the slider, as shown in FIG. 13. It is the stronger spring force of the line connector which opens the slider valve. Once fully opened, the limit stop formed by the ledge 327 of the slider valve then provides a probe that serves to open the line connector valve 84' upon further motion of the line connector into the slider. In the position of FIG. 13, the end 73' of the line connector is fully seated in a matching shaped wall 319 of the slider.

Further urging of the line connector body 71' into the fitment 301, in a direction toward the fitment, moves the slider into the container, as shown in FIG. 14. In this position, the commercially available line connector 70' is then fully latched within its own supporting structure. A stable connection exists, wherein liquid is removed from the container, through the two opened valves, and into a hose that is connected to the line connector.

Figure 15:
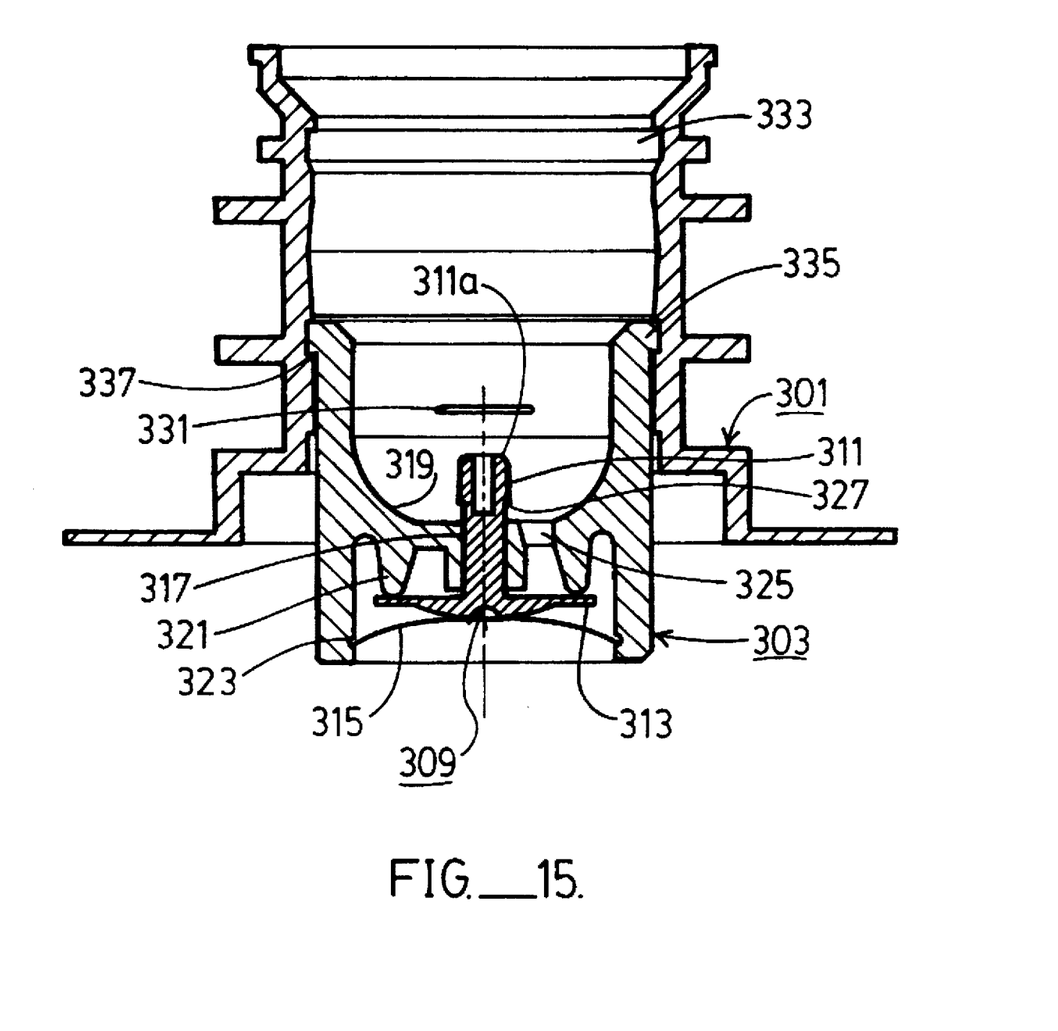

When it is desired to disconnect the container, the line connector body 71' is pulled out of the slider 303, first causing the line connector valve 84' to close, followed by the slider valve 309 closing. After complete removal of the line connector body 71' from the slider 303, as shown in FIG. 15, the slider 303 remains in the same position as in FIG. 14 while its valve 309 is fully closed to liquid flow out of the bag. If it is desired to reconnect the line connector to the same container, the connector body is inserted into the slider 303 in its position shown in FIG. 15 and the two valves are cooperatively opened in the same manner as described above. There is no need to move the slider upon disconnection of the line connector in order to liquid seal the container.

When the line connector body 71' is fully positioned within the slider after connection with the container (FIG. 14), the compressive force of the resilient O-ring 75' that is held in an annular groove 307 on the outside of the connector body 71' is usually sufficient to hold the line connector in place while liquid is being withdrawn from the container. However, these O-rings can, after extensive use, become so degraded in some cases that the forces of the valve springs 87' and 315 can push the line connector body 71' out of the slider 303. In order to prevent this, where necessary, an annular ridge 331 is formed on an inside wall of the slider 303 and extending inward. This ridge 331 may extend entirely around the slider, or two or more such shorter ridges provided around the inside circumference of the slider 303. The ridge 331 is positioned to engage the O-ring groove 307 of the line connector body 71' when the connector body is seated in the slider (FIGS. 13 and 14). The dimensions of the ridge 331 and the resiliency of the plastic material used for the slider 303 relative to that of the connector body 71' are chosen to result in the ridge 331 snapping into the groove 307 when the connector body is inserted, and to provide enough resistance to involuntary movement of the connector body 71' out of the slider 303. But this holding force is made small enough to allow the connector body 71' to be so removed by hand when it is desired to disconnect the line connector from the container.

The outside surface of the slider 303 and the inside surface of the fitment 301 are generally formed in cooperating cylindrically shaped surfaces. However, it is desired to provide two positively latched positions of the slider relative to the fitment. One such position is that shown in FIG. 10, before a first connection of a line connector to the container. This stable position results from an annular groove 333 in the inside surface of the fitment 301 and a matching annular ring 335 extending outward of an end of the slider 303. The relative dimensions of these elements and the characteristics of the plastic material used to form the fitment 301 and slider 303, are selected so that the slider does not move when the valves 84' and 309 are opened upon the line connector body 71' being inserted into the slider. It is preferred that the slider does not begin to move into the bag until the line connector body 71' is seated in the slider (FIGS. 13 and 14), and hand force is provided to overcome the forces of the latch formed by the groove 333 and ring 335.

Similarly, it is desired to hold the slider 303 in the position shown in FIG. 15 against forces that are applied to it when the line connector body 71' is removed. In the embodiment being described, there are two attachments of the slider 303 to the line connector body 71' which tend to cause the slider to move out of the bag when the line connector is removed. These are the seal provided by the O-ring 75' and the holding force of the slider ridge 331 positioned within the line connector body groove 307. In order to hold the slider against these forces in the position shown in FIG. 15 as the line connector body 71' is pulled out of the slider 303, another annular groove 337 is provided on the inside of the fitment 301 to capture the ring 335 of the slider 303 when in the position there shown. Since the slider 303 is not moved back into the fitment at any time before the container is emptied and then discarded, the latch formed by the groove 337 and ring 335 need not be designed to provide for such withdrawal. However, if used on a reusable container, the ability to remove the slider entirely from the fitment would be provided.

Although the various aspects of the present invention have been described with respect to their preferred embodiments, it will be understood that the invention is entitled to protection within the full scope of the appended claims.

It is claimed:

1. In a combination of a service line connector including a first valve member therein which is resiliently loaded to normally close off an end opening thereof and having a mechanism outside of said end for removable attachment to a spout fitment that is carried by a container and which includes a dispensing valve member held therein to receive the connector end for establishing a fluid path from an interior of the container to a service line attached to the connector, said dispensing valve member, comprising:

a shell having first open end into which the connector end is inserted, a wall extending thereacross a distance from the shell first end which includes a fluid opening therein, and an outside surface carried by the spout fitment in a manner that the shell is slidable with respect to the fitment from a first position outside of said container to a second position extending into the container, a second valve member extending through said wall and having one end terminating in a probe facing toward said shell first end and including a sealing element on a side of said wall opposite to said shell first end that covers said fluid opening when said second valve member is urged toward the shell first end, said probe being positioned and dimensioned to be inserted into said connector end to open its said first valve member when the connector end is inserted into the shell first open end, means positioned within said shell for resiliently urging said second valve member toward said shell first end in a manner to normally cover said fluid opening with said sealing element when the connector end is removed from said shell first open end, and a surface as part of said shell that is complementarily shaped with said connector end for causing said shell to slide from its said first position to its said second position as the connector end is urged into said shell first end with the first valve member and second valve member probe contacting each other.

2. The combination of claim 1 wherein the improved dispensing valve member further comprises an absence of any attachment between the connector and the dispensing valve member that causes the shell to withdraw from its said second position extending into the container toward its said first position upon withdrawal of the connector end from said shell first end.

3. The combination of either of claims 1 or 2 wherein only said second member probe of the improved slidable dispensing valve member functions to open the first valve member as the connector end is positioned into the shell first open end.

4. The combination of either of claims 1 or 2 wherein said second valve member includes at least one edge extending outward therefrom a distance from an end of the probe and in a position to engage said connector end adjacent its said end opening as the connector is inserted into the shell first open end, whereby motion of the line connector end against said edge causes the second valve member to move through said wall opening against its said resilient holding means, said distance between said probe end and said edge being sufficient to open the first valve member to establish fluid flow through the connector end opening.

5. The combination of either of claims 1 or 2 wherein said second valve member includes an edge extending outward therefrom a distance from an end of the probe in order to contact said wall to limit an extent of travel of the second valve member through said through said wall when the connector end is inserted into the shell first open end.

6. In a combination of a service line connector including a first valve member therein which is resiliently loaded to normally close off an end opening thereof and having a mechanism outside of said end for removable attachment to a spout fitment that is carried by a container and which includes a dispensing valve member held therein to receive the connector end for establishing a fluid path from an interior of the container to a service line attached to the connector, said dispensing valve member, comprising:

a shell having first open end into which the connector end is inserted, a wall extending thereacross a distance from the shell first end which includes a fluid opening therein, and an outside surface carried by the spout fitment in a manner that the shell is slidable with respect to the fitment from a first position outside of said container to a second position extending into the container, a second valve member extending through said wall and having one end terminating in a probe facing toward said shell first end and including a sealing element on a side of said wall opposite to said shell first end that covers said fluid opening when said second valve member is urged toward the shell first end, said probe being positioned and dimensioned to be inserted into said connector end to open its said first valve member when the connector end is inserted into the shell first open end, means positioned within said shell for resiliently urging said second valve member toward said shell first end in a manner to normally cover said fluid opening with said sealing element when the connector end is removed from said shell first open end, wherein a resilient strength of the resiliently loaded first valve member is less than a resilient strength of the second valve member resilient means, whereby the second valve member opens first when the connector end is inserted into the shell first end, and a surface as part of said shell that is complementarily shaped with said connector end for causing said shell to slide from its said first position to its said second position as the connector end is urged into said shell first end with the first valve member and second valve member probe contacting each other.

7. In a combination of a service line connector including a first valve member therein which is resiliently loaded to normally close off an end opening thereof and having a mechanism outside of said end for removable attachment to a spout fitment that is carried by a container and which includes a dispensing valve member held therein to receive the connector end for establishing a fluid path from an interior of the container to a service line attached to the connector, said dispensing valve member, comprising:

a shell having first open end into which the connector end is inserted, a wall extending thereacross a distance from the shell first end which includes a fluid opening therein, and an outside surface carried by the spout fitment in a manner that the shell is slidable with respect to the fitment from a first position outside of said container to a second position extending into the container, a second valve member extending through said wall and having one end terminating in a probe facing toward said shell first end and including a sealing element on a side of said wall opposite to said shell first end that covers said fluid opening when said second valve member is urged toward the shell first end, said probe being positioned and dimensioned to be inserted into said connector end to open its said first valve member when the connector end is inserted into the shell first open end, means positioned within said shell for resiliently urging said second valve member toward said shell first end in a manner to normally cover said fluid opening with said sealing element when the connector end is removed from said shell first open end, wherein a resilient strength of the resiliently loaded first valve member is less than a resilient strength of the second valve member resilient means, whereby the first valve member opens first when the connector end is inserted into the shell first end, and a surface as part of said shell that is complementarily shaped with said connector end for causing said shell to slide from its said first position to its said second position as the connector end is urged into said shell first end with the first valve member and second valve member probe contacting each other.

8. In a combination of a service line connector including a first valve member therein which is resiliently loaded to normally close off an end opening thereof and having a mechanism outside of said end for removable attachment to a spout fitment that is carried by a container and which includes a dispensing valve member held therein to receive the connector end for establishing a fluid path from an interior of the container to a service line attached to the connector, said dispensing valve member, comprising:

a shell having first open end into which the connector end is inserted, a wall extending thereacross a distance from the shell first end which includes a fluid opening therein, and an outside surface carried by the spout fitment in a manner that the shell is slidable with respect to the fitment from a first position outside of said container to a second position extending into the container, a second valve member extending through said wall and having one end terminating in a probe facing toward said shell first end and including a sealing element on a side of said wall opposite to said shell first end that covers said fluid opening when said second valve member is urged toward the shell first end, said probe being positioned and dimensioned to be inserted into said connector end to open its said first valve member when the connector end is inserted into the shell first open end, means positioned within said shell for resiliently urging said second valve member toward said shell first end in a manner to normally cover said fluid opening with said sealing element when the connector end is removed from said shell first open end, a surface as part of said shell that is complementarily shaped with said connector end for causing said shell to slide from its said first position to its said second position as the connector end is urged into said shell first end with the first valve member and second valve member probe contacting each other, wherein the service line connector additionally includes an annular groove therearound adjacent said connector end and a resilient O-ring positioned therein for establishing a fluid seal with an inside surface of the shell when the connector end is inserted into the shell first open end, and wherein the shell additionally includes a projection carried by an inside surface thereof in a position to be caught in the line connector annular groove when the connector end is fully inserted into the shell first open end.

9. The combination of either claims 6 or 7 wherein the improved dispensing valve member further comprises an absence of any attachment between the connector and the dispensing valve member that causes the shell to withdraw from its said second position within the fitment toward its said first position upon withdrawal of the connector end from said shell first end.

10. The combination of claim 1 wherein said fluid opening provides the exclusive fluid path into and out of the container within the fitment.

11. For a combination of a service line connector including a resiliently loaded valve normally covering an opening at an end of said line connector, said line connector having a mechanism outside of said end for removable attachment to a spout that is carried by a container for establishing a fluid path from an interior of the container to said service line connector, said container spout comprising:

a fitment attached to the container;

a shell having first open end into which the line connector end is insertable, a wall extending thereacross a distance from the shell first end which includes a fluid opening therein, and an outside surface carried by the spout fitment in a manner that the shell is slidable with respect to the fitment from a first position outside of said container to a second position extending into the container, a valve member extending through said wall and including a sealing surface positioned on a side of said wall opposite to said shell first end that covers said fluid opening when said valve member is urged toward the shell first end, said valve member being positioned and dimensioned to contact said line connector end surrounding said line connector valve in a manner that when the line connector end is inserted into the shell first open end, said sealing surface is urged away from said wall, thereby uncovering said fluid opening;

means positioned within said shell for resiliently urging said valve member toward said shell first end in a manner to normally cover said fluid opening with said sealing surface when the line connector end is removed from said shell first open end, and a surface as part of said shell that is complementarily shaped with said line connector end for causing said shell to slide from its said first position to its said second position as the line connector end is urged into said shell first end.

12. The container spout of claim 11 further comprising an absence of any attachment mechanism for attaching to the line connector that causes the shell to withdraw from its said second position extending into the container toward its said first position upon withdrawal of the line connector end from said shell first end.

13. The container spout of either of claims 11 or 12 wherein said valve member includes a probe extending through said wall and at least one edge extending outward therefrom a distance from an end of the probe and in a position to engage said line connector end adjacent its said end opening as the line connector is inserted into the shell first open end, and in said manner that when the line connector end is inserted into the shell first open end, said sealing surface is urged away from said wall, thereby uncovering said fluid opening.

14. The container spout of either of claims 11 or 12, further comprising a projection held by the shell such that the projection causes the line connector valve to open as the line connector is inserted into the shell.

15. The container spout of claim 14 wherein said projection includes a probe and an edge extending outward therefrom a distance from an end of the probe in order to contact said wall to limit an extent of travel of the valve member through said wall when the line connector end is inserted into the shell first open end.

16. The container spout of claim 11, wherein the service line connector additionally includes an annular groove therearound adjacent said line connector end and a resilient O-ring positioned therein for establishing a fluid seal with an inside surface of the shell when the line connector end is inserted into the shell first open end, and wherein the shell additionally includes an extension carried by an inside surface thereof in a position to be caught in the line connector annular groove when the line connector end is fully inserted into the shell first open end.

17. A spout assembly for fluid communication with a service line connector which has a first valve member being resiliently loaded to normally close off an end opening thereof and having a mechanism outside of said end for removable attachment to said spout assembly, said spout assembly comprising:

a fitment having first and second open ends and a fluid passageway therebetween, said first open end capable of receiving the line connector end in manner that a fluid seal is established between said line connector and said fitment for preventing fluid from leaking out through said first open end;

a wall extending across said fluid passageway a distance from said first open end and including a fluid opening therein;

a second valve member extending through said wall and including a sealing surface positioned on a side of said wall opposite to said first open end that covers said fluid opening when said second valve member is urged toward the first open end, said second valve member further including an extending member positioned and dimensioned to be capable of contacting said line connector end without contacting the first valve member and in a manner that when the line connector end is inserted into said first open end, said sealing surface is urged away from said wall, thereby uncovering said fluid opening for allowing fluid flow through said fluid passageway for establishing said fluid communication with said line connector; and means positioned within said fitment for resiliently urging said second valve member toward said first open end in a manner to normally cover said fluid opening with said sealing surface when the line connector end is removed from said first open end.

18. The spout assembly of claim 17, wherein the second valve member includes a projection for causing the first valve member to open when the line connector is inserted into the fitment.

19. The spout assembly of claim 18, wherein said second valve member further includes a plurality of extending members equally spaced around said projection.

20. The spout assembly of claim 19, wherein said plurality of extending members is a plurality of ribs and said projection is a probe.

21. The spout assembly of claim 20, wherein said probe is dimensioned and positioned to be capable of contacting said first valve member in a manner that when the line connector end is inserted into said first open end, said probe urges said line connector valve member away from said line connector end opening, thereby uncovering said line connector opening for allowing fluid flow therethrough.

22. The spout assembly of claim 21, wherein said probe is positioned closer to said first open end than said plurality of ribs such that when the line connector end is inserted into the fitment through said first open end, said probe urges said first valve member away from said line connector opening prior to said line connector end urging said sealing surface away from said fluid opening.

23. A spout for providing a fluid connection between a container and a service line connector, the connector being of a type having a resiliently loaded first valve member normally closing off an end opening of said connector and including a mechanism outside of said end for removable attachment to said spout, said spout comprising:

a fitment capable of being attached to said container;

a shell having a first open end capable of receiving therethrough said line connector end, a wall extending thereacross a distance from the shell first end which includes a fluid opening therein, and an outside surface carried by the spout fitment in a manner that the shell is capable of sliding with respect to the fitment from a first position outside of said container to a second position extending into the container, a second valve member extending through said wall and including a sealing element positioned on a side of said wall opposite to said shell first end that covers said fluid opening when said second valve member is urged toward the shell first end, said first valve member further including an extending member positioned and dimensioned to contact the line connector end without contacting said first valve member, and in a manner that when the line connector end is inserted into the shell first open end, said sealing surface is urged away from said wall, thereby uncovering said fluid opening, means positioned within said shell for resiliently urging said second valve member toward said shell first end in a manner to normally cover said fluid opening with said sealing element when the line connector end is removed from said shell first open end, and a surface as part of said shell that is complementarily shaped with said line connector end for causing said shell to slide from its said first position to its said second position when the connector end is urged against said shell surface.

24. The spout of claim 23 further comprising an absence of any attachment that causes the shell to withdraw from its said second position toward its said first position upon withdrawal of the line connector end from said shell first end.

25. The spout of either of claims 23 or 24, further including a projection held by said shell for causing said first valve member of said line connector to open when said line connector end is inserted into said shell first open end.

26. The spout of claim 25 wherein the projection is a probe capable of opening the first valve member of the line connector when the line connector end is positioned into the shell first open end.

27. The spout of claim 26 wherein said extending member of said second valve member comprises a first edge of said probe extending outward therefrom a distance from an end of the probe and in a position capable of engaging said connector end adjacent its said end opening in a manner that when the line connector end is inserted into said shell first open end, said line connector end urges against said first edge causing said sealing element to move away from said wall opening against its said resilient holding means, said distance between said probe end and said first edge being sufficient so that it is capable of opening the first valve member of the line connector to establish fluid flow through the line connector end opening.

28. The spout of claim 27 wherein said extending member includes a second edge extending outward from the probe and at a distance from an end of the probe in order to contact said wall to limit an extent of travel of the second valve member through said wall when the line connector end is inserted into the shell first open end.

* * * * *